(12) United States Patent
Matecki

(10) Patent No.: US 11,590,911 B2
(45) Date of Patent: Feb. 28, 2023

(54) HYBRID BUMPER ASSEMBLY FOR A VEHICLE

(71) Applicant: Shape Corp., Grand Haven, MI (US)

(72) Inventor: Joseph R. Matecki, Allendale, MI (US)

(73) Assignee: Shape Corp., Grand Haven, MI (US)

( * ) Notice: Subject to any disclaimer, the term of this patent is extended or adjusted under 35 U.S.C. 154(b) by 96 days.

(21) Appl. No.: 16/939,977

(22) Filed: Jul. 27, 2020

(65) Prior Publication Data

US 2021/0024022 A1 Jan. 28, 2021

Related U.S. Application Data

(60) Provisional application No. 62/878,790, filed on Jul. 26, 2019.

(51) Int. Cl.

| | |
|---|---|
| *B60R 19/12* | (2006.01) |
| *B60R 19/03* | (2006.01) |
| *B60R 19/18* | (2006.01) |
| *B60R 19/34* | (2006.01) |
| *B23K 9/007* | (2006.01) |
| *B23K 9/23* | (2006.01) |
| *B23K 101/00* | (2006.01) |
| *B60R 19/24* | (2006.01) |

(52) U.S. Cl.
CPC .............. *B60R 19/12* (2013.01); *B23K 9/007* (2013.01); *B23K 9/232* (2013.01); *B60R 19/03* (2013.01); *B60R 19/18* (2013.01); *B60R 19/34* (2013.01); *B23K 2101/006* (2018.08); *B60R 2019/1826* (2013.01); *B60R 2019/247* (2013.01)

(58) Field of Classification Search
CPC ......... B60R 19/12; B60R 19/03; B60R 19/18; B60R 19/34; B60R 2019/1826; B60R 2019/247; B23K 9/007; B23K 9/232; B23K 2101/006
USPC ......................................................... 293/133
See application file for complete search history.

(56) References Cited

U.S. PATENT DOCUMENTS

| | | | | |
|---|---|---|---|---|
| 6,164,709 A | * | 12/2000 | Kuczynski | F16F 7/12 293/109 |
| 6,244,638 B1 | * | 6/2001 | Kuczynski | B60R 19/18 293/109 |
| 6,971,691 B1 | * | 12/2005 | Heatherington | B60R 19/18 293/154 |

(Continued)

FOREIGN PATENT DOCUMENTS

| | | |
|---|---|---|
| EP | 3604045 A1 | 2/2020 |
| WO | 2020/058485 A1 † | 3/2020 |

*Primary Examiner* — Pinel E Romain
(74) *Attorney, Agent, or Firm* — Bodman PLC

(57) ABSTRACT

A hybrid bumper assembly for a vehicle includes a steel reinforcement beam and aluminum crush cans attached to end portions of the steel reinforcement beam. The reinforcement beam has a multi-tubular shape that is formed by a high-strength steel sheet that is roll formed to provide at least two tubular portions. A crush can has an interfacing portion that is coupled to an end portion of the reinforcement beam. The end portions of the reinforcement beam and the interfacing portion of the crush cans may be configured to attach together using a select joining technology in a manner that minimizes or eliminates bimetallic or galvanic corrosion between the reinforcement beam and the crush cans.

20 Claims, 11 Drawing Sheets

(56) References Cited

U.S. PATENT DOCUMENTS

| | | | |
|---|---|---|---|
| 6,986,536 B1* | 1/2006 | Heatherington | B60R 19/03 |
| | | | 293/102 |
| 8,276,954 B2 | 10/2012 | Handing et al. | |
| 10,456,850 B2* | 10/2019 | Hill | B23K 10/02 |
| 10,875,115 B2* | 12/2020 | Hill | B23K 35/28 |
| 2008/0042455 A1* | 2/2008 | Nees | B60R 19/34 |
| | | | 293/132 |
| 2018/0272414 A1 | 9/2018 | Maeda et al. | |

\* cited by examiner
† cited by third party

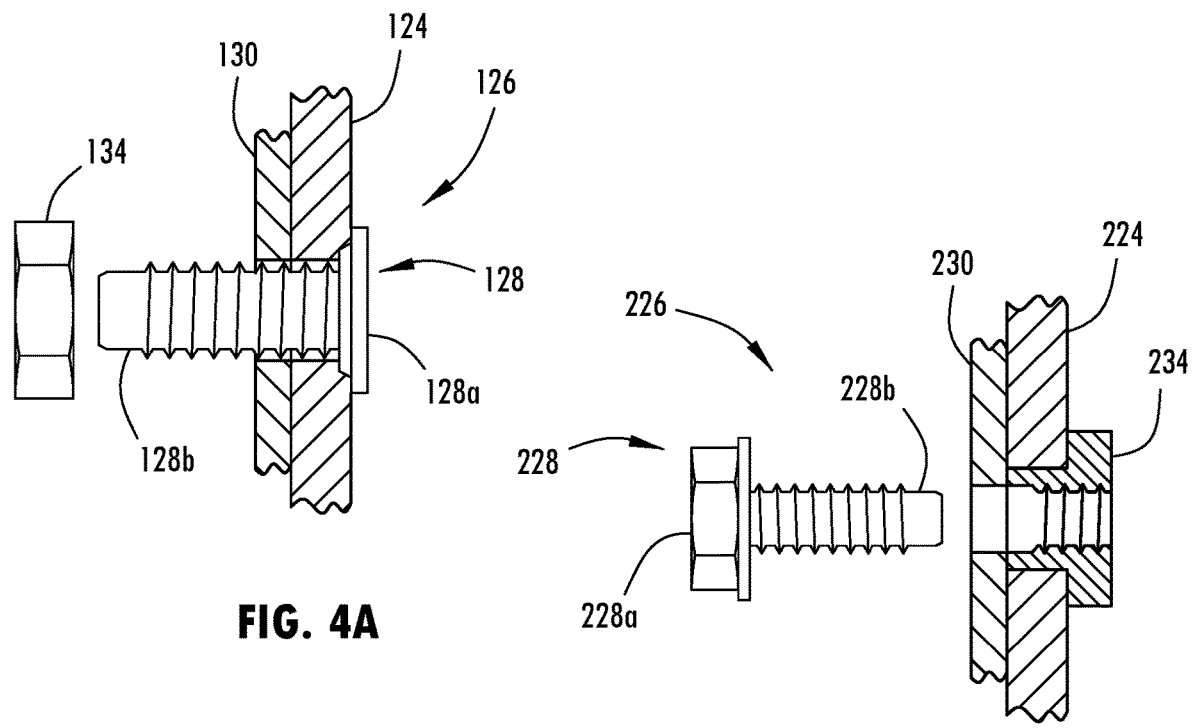
FIG. 4A
FIG. 4B
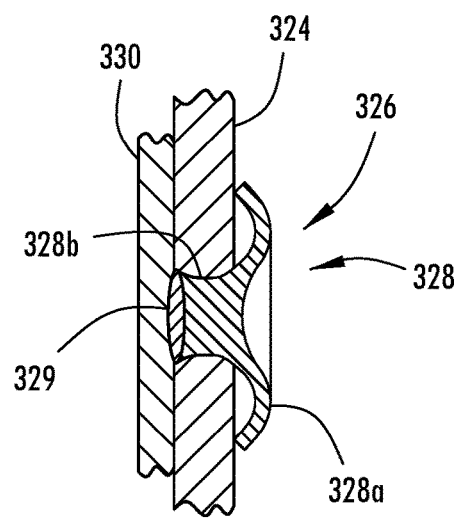
FIG. 4C
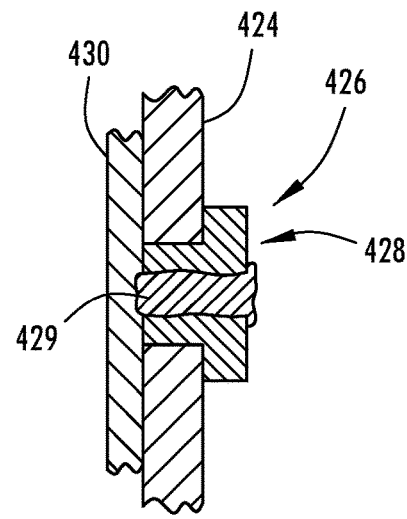
FIG. 4D

HYBRID BUMPER ASSEMBLY FOR A VEHICLE

CROSS-REFERENCE TO RELATED APPLICATION

This application claims priority under 35 U.S.C. § 119(e) to U.S. Provisional Patent Application No. 62/878,790, filed Jul. 26, 2019, the disclosure of this prior application is considered part of this application and is hereby incorporated by reference in its entirety.

TECHNICAL FIELD

The present disclosure relates to vehicle bumper assemblies, and more particularly to assembled bumper reinforcement beams and crush cans mounted at vehicle front and rear ends.

BACKGROUND

Vehicles are subjected to various crash tests that are mandated by government regulations and insurance certifications, such as tests for impact energy management and absorption from high speed and low speed crash impacts at various locations on the vehicle. The results of these tests may be dependent on various vehicle components and structural designs, including the construction of bumper assemblies. Vehicle bumper assemblies are also designed to maximize strength-to-weight ratios in an effort to minimize the overall vehicle weight, while balancing the cost of these vehicle components.

SUMMARY

The present disclosure provides a hybrid bumper assembly that includes a bumper reinforcement beam and crush cans attached to end portions of the reinforcement beam. The reinforcement beam of the hybrid bumper assembly is formed with a steel material, such as a high-strength steel sheet that is roll formed to provide two adjacent tubular portions that extend longitudinally along a length of the reinforcement beam. The crush cans of the hybrid bumper assembly are formed with an aluminum alloy, such as via extrusion or stamping or the like. The combined impact strength and cost of the hybrid bumper assembly having a high-strength steel beam and aluminum alloy crush cans has the unexpected result of being lighter than similarly performing all aluminum bumper assemblies and outperforming similarly weighted bumper assemblies, such as those that are constructed with an aluminum reinforcement beam or those that utilize steel crush cans.

To prevent galvanic corrosion between the aluminum alloy of the crush cans and the steel material of the reinforcement beam, the end portions of the reinforcement beam and the interfacing portion of the crush cans may be attached together with a select joining technology that provides the desired joining strength and robust connection for a bumper assembly, while also minimizing or eliminating the direct contact or direct welding between the steel material of the reinforcement beam and the aluminum alloy of the crush can. In some implementations, the select joining technology involves the use of a dual-material coupling feature that attaches a flange of the crush can with a rear wall of the reinforcement beam. Such a dual-material coupling feature may include a mechanical coupling feature, such as a resistance spot rivet (RSR), an element arc spot weld (EASW) rivet, a self-piercing and clinch (SPAC) nut with a bolt, a clinch stud, or a self-piercing rivet (SPR), among others. The dual-material coupling feature may also combine the mechanical coupling feature with the use of adhesives to form the connections. In other implementations, the select joining technology involves forming the crush can with a tailor welded blank that includes a steel sheet portion that is braze welded to an aluminum sheet portion. The tailor welded blank may be stamped to form the steel sheet portion as at least part of a flange of the crush can, such that a fusion weld may connect the steel sheet portion of the crush can with the steel material of the reinforcement beam. Furthermore, the joining technology may also or alternatively include the use of an insulator or coating, such as zinc or paint, that prevents direct contact and acts as a barrier between the steel material of the reinforcement beam and the aluminum alloy of the crush can.

According to one aspect of the present disclosure, a hybrid bumper assembly includes a multi-tubular reinforcement beam that has a high-strength steel sheet material. A crush can comprises an aluminum alloy. The crush can has a tubular body and a flange protruding at a front end of the tubular body. A dual-material coupling feature fixedly attaches the flange of the crush can with a wall of the multi-tubular reinforcement beam. In some implementations, the dual-material coupling feature includes an element arc spot weld rivet, such as element arc spot weld rivet having a ring element engaged with the flange of the crush can and a puddle weld disposed in a central opening of the ring element attaching the ring element to the wall of the multi-tubular reinforcement beam.

According to another aspect of the present disclosure, a hybrid bumper assembly includes a reinforcement beam that has at least one tubular shape that extends along a length of the reinforcement beam. The reinforcement beam comprises a high-strength steel sheet. A crush can has a tubular portion that comprises an aluminum alloy. The crush can also has a pair of flanges that extend from a front section the tubular portion of the crush can. A dual-material coupling feature is disposed at each of the pair of flanges and extends between the crush can and the reinforcement beam to form a fixed connection. The dual-material coupling feature is configured to prevent galvanic corrosion between the aluminum alloy of the crush can and the high-strength steel sheet of the reinforcement beam.

According to yet another aspect of the present disclosure, a hybrid bumper assembly for a vehicle includes a bumper reinforcement beam having a top wall and a bottom wall extending along the length of the beam. The top and bottom walls of the bumper reinforcement beam comprises a high-strength steel sheet. A crush can has a tubular portion with four integrally connected walls to provide a generally hollow rectangular cross-sectional shape. The crush can comprises an aluminum alloy. The crush can also has a pair of front flanges that integrally extend from an upper wall and a lower wall of the tubular portion to define a channel between the pair of front flanges. The bumper reinforcement beam is disposed in the channel. A dual-material coupling feature extends between at each of the pair of front flanges and the respective top wall and bottom wall of the reinforcement beam to form a fixed connection. The dual-material coupling feature is configured to prevent galvanic corrosion between the aluminum alloy of the crush can and the high-strength steel sheet of the reinforcement beam.

The details of one or more implementations of the disclosure are set forth in the accompanying drawings and the description below. These and other aspects, advantages, purposes, and features will be apparent upon review of the following specification in conjunction with the drawings.

BRIEF DESCRIPTION OF THE DRAWINGS

FIG. 4A is a cross-sectional view of a self-clinching stud at an attachment interface between a reinforcement beam and a crush can;

FIG. 4B is a cross-sectional view of a self-piercing and clinch (SPAC) nut at an attachment interface between a reinforcement beam and a crush can;

FIG. 4C is a cross-sectional view of a resistance spot rivet (RSR) at an attachment interface between a reinforcement beam and a crush can;

FIG. 4D is a cross-sectional view of an element arc spot weld (EASW) rivet at an attachment interface between a reinforcement beam and a crush can;

DETAILED DESCRIPTION

Figure 1:
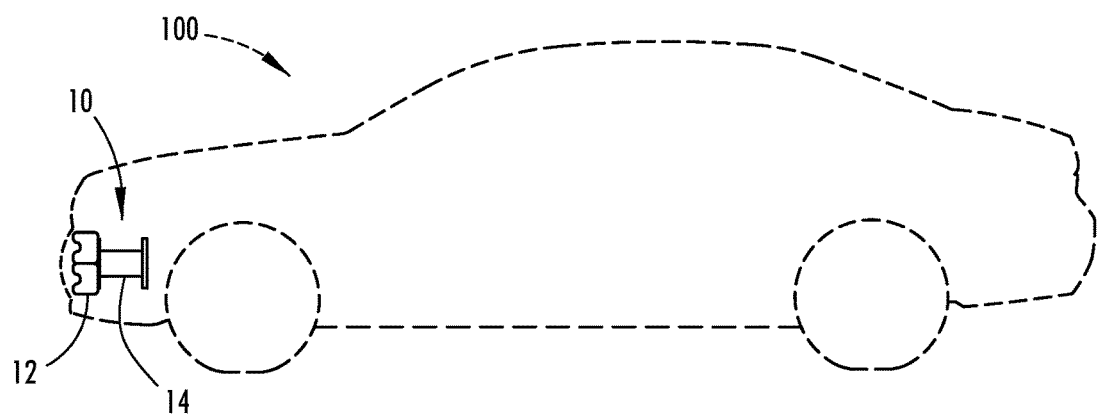
FIG. 1 is a schematic side view of a vehicle having a bumper assembly.

Referring now to the drawings and the illustrative examples depicted therein, a hybrid bumper assembly 10 includes a reinforcement beam 12 and crush cans 14 that are attached to end portions 16 of the reinforcement beam 12. The crush cans 14 are adapted to mount directly or indirectly to the vehicle frame tips or end sections of a vehicle frame. When attached to the vehicle frame, the crush cans 14 support and position the reinforcement beam 12 to span laterally across the vehicle 100, such as at the front end shown in FIG. 1. Alternatively, additional implementations of the bumper assembly may be disposed at the rear end of the vehicle to similarly mitigate impact damage and intrusion to the vehicle.

The reinforcement beam 12 that spans laterally across the vehicle provides an impact face configured to receive impact forces and transmit those forces to the crush cans 14. The reinforcement beam 12 may be formed from a steel material to provide a desired cross-sectional shape that is cost effective, light weight, and provides desirable impact performance. In some implementations of the bumper assembly 10, the reinforcement beam is roll formed or stamped from a steel sheet, such as to provide a tubular or multi-tubular shape, such as the dual-tubular shape shown in FIGS. 2 and 3. It is contemplated that other implementations of the reinforcement beam may have alternative cross-sectional shapes, such as a D-shape, a B-shape, or an open cross-sectional shape.

Figure 2:
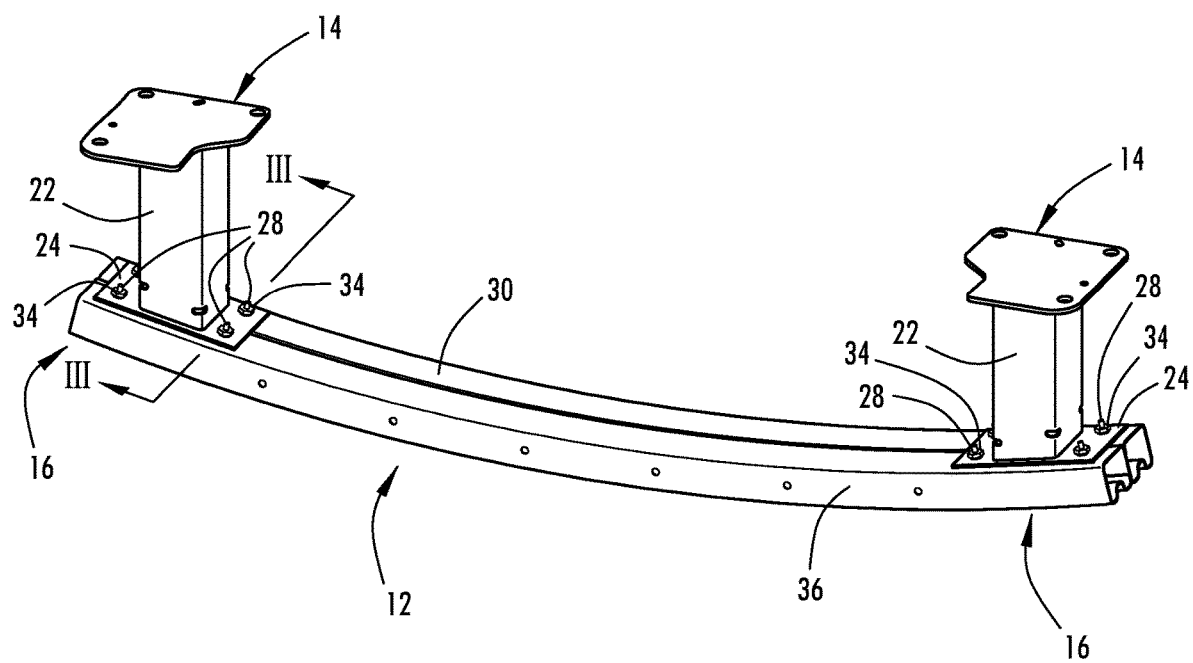
FIG. 2 is a perspective view of a bumper assembly.

As shown for example in FIG. 1, the crush cans 14 generally receive impact loads from the reinforcement beam 12 in a longitudinal direction relative to the vehicle 100, such that the impact loads are applied axially to the crush can. The crush cans 14 have a tubular body 22 that is shaped to absorb the impact loads with axial deformation, so as to be oriented in a generally longitudinal direction relative to the vehicle. To provide desired crush characteristics under such loading conditions, while also being cost effective and light weight, the crush cans 14 are formed with an aluminum alloy, such as via extrusion or stamping or the like. When formed from extrusion, such as shown in FIG. 2, the crush cans 14 have a consistent cross-sectional shape along their lengths. However, it is contemplated that other examples of the crush can may have a tapered or alternative cross-sectional design. To attach the he crush cans 14 to the reinforcement beam 12, the crush cans 14 may each have a flange 24 integrally formed or attached at a front end of the tubular body.

By forming the reinforcement beam 12 at least partially with steel and forming the crush cans 14 at least partially with aluminum, the hybrid bumper assembly 10 may have a combined weight that is lighter than similarly performing all aluminum or all steel bumper assemblies. Similarly, the combined steel reinforcement beam 12 and aluminum crush cans 14 may have lower cost and impact performance characteristics that unexpectedly outperform similarly weighted bumper assemblies, such as those that are constructed with an aluminum reinforcement beam and steel crush cans, an aluminum beam and aluminum crush cans, or a steel beam and steel crush cans.

To prevent weakening or failure from bimetallic or galvanic corrosion between the aluminum alloy of the crush cans 14 and the steel material of the reinforcement beam 12, the reinforcement beam 12 and the crush cans 14 may be attached together with a dual-material joining arrangement that provides the desired joining strength, a relatively low weight, and a robust connection for maintaining the performance of the bumper assembly, while also minimizing or eliminating the direct contact or fusion welding between the steel material of the reinforcement beam 12 and the aluminum alloy of the crush can 14. The dual-material joining arrangement, thus, deters corrosion or failure between the steel and aluminum components of the bumper assembly. The dual-material joining arrangement is applied between the end portions 16 of the reinforcement beam 12 and an interfacing portion of the crush cans 14, such as shown in FIGS. 2 and 3 between the flange 24 and the rear wall 30 of the reinforcement beam 12.

In some implementations, such as the examples shown in FIGS. 2-5, the dual-material joining arrangement involves the use of a dual-material coupling feature 26 that attaches a front end portion of the crush can 14 with a rear portion of the reinforcement beam 12. Such a dual-material coupling feature provides a mechanical means of attachments, such as a resistance spot rivet (RSR), an element arc spot weld (EASW) rivet, a self-piercing and clinch (SPAC) nut with a coated bolt, a clinch stud, or a self-piercing rivet (SPR), among others coupling features. In some examples, the dual-material coupling feature 26 may utilize a fastening element that generally has a head portion and a shaft portion. The head portion may be coupled with an outer surface of the flange 24 of the crush can 14 or the rear wall 30 of the reinforcement beam 12, where such coupling may be done by deforming the underlying surface, such as with a SPAC nut or clinch stud, or by placing the head portion in contact with the underlying surface, such as with an RSR or EASW rivet. The shaft portion of the fastening element may extend from the head portion into the material coupled with the head portion so that shaft portion can couple with the other material (the reinforcement beam 12 or the crush can 14), where such coupling may be done by welding, such as with an RSR or EASW rivet, or may be done by threadably engaging a corresponding fastener type, such as a nut for a clinch stud or a bolt for a SPAC nut. The dual-material coupling feature may also include an insulator or coating to prevent direct contact between the differing materials. It is also contemplated that the dual-material coupling feature may also include an adhesive applied between the coupling feature and the underlying surface to assist with forming a robust attachment and preventing contact between the differing materials.

Figure 3:
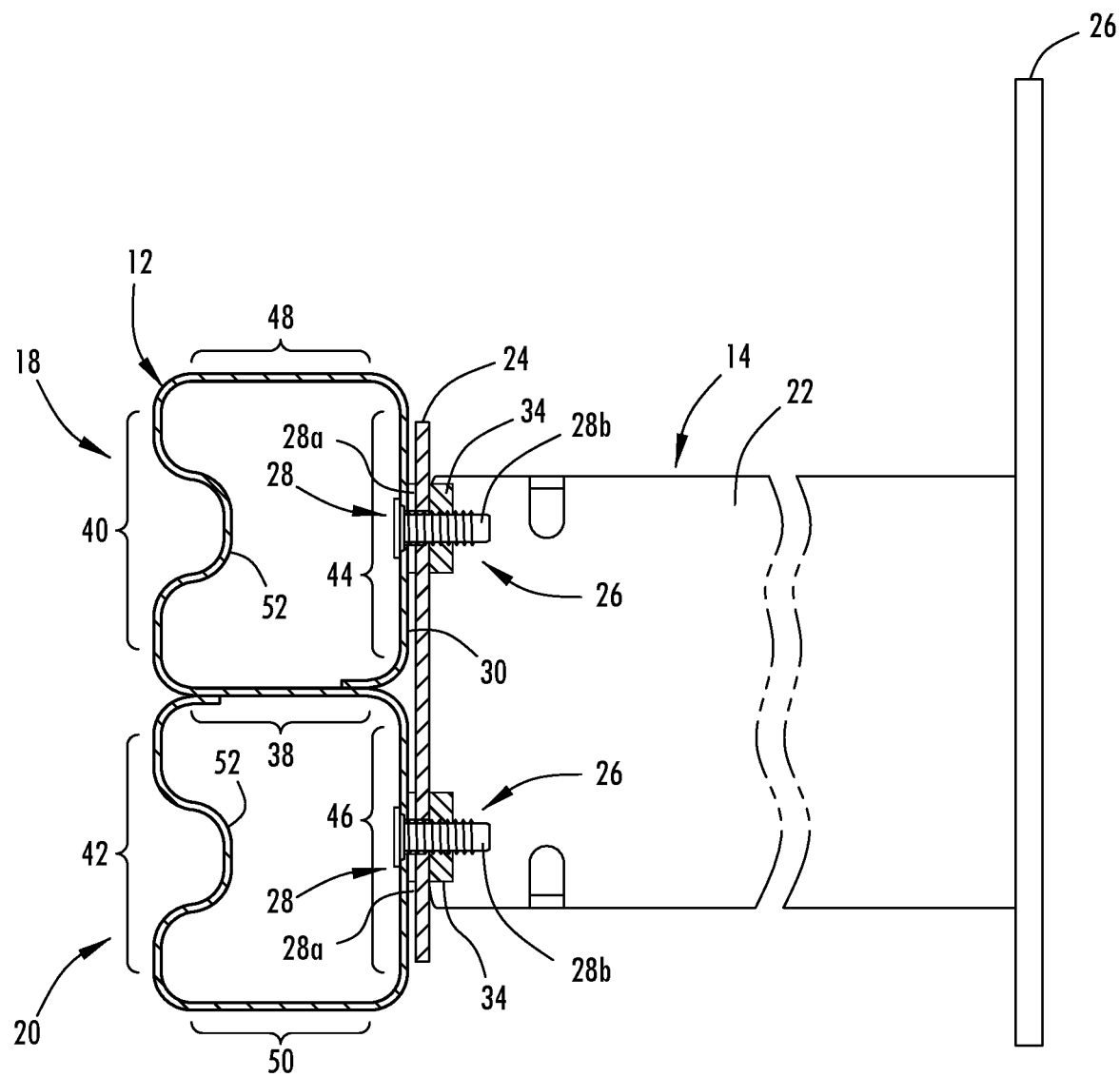
FIG. 3 is a cross-sectional view of the bumper assembly shown in FIG. 2, showing an attachment interface between a reinforcement beam and a crush can.

Referring now to FIGS. 2 and 3, the dual-material coupling feature 26 includes a clinch stud 28, which may also be referred to as a self-clinching stud. As shown in FIG. 3, the clinch stud 28 is attached to a rear wall 30 of the reinforcement beam 12. This may be done by inserting the stud portion 28b of the clinch stud 28 through an access opening in the front wall of reinforcement beam 12 for a head portion 28a of the clinch stud 28 to engage and attached at the rear wall 30 of the reinforcement beam 12. To engage the rear wall 30, a press may force the head portion 28a of the clinch stud 28 against an interior surface of the rear wall 30, so as to compress and deform the edge of the opening in the rear wall 30 into recessed areas on the peripheral area of the head portion 28a of the clinch stud 28. The head portion of the clinch stud may include teeth spaced circumferentially around the head portion that protrude axially toward the opposing end of the clinch stud, such that the recessed areas are defined between the teeth. Upon pressing the clinch stud against the rear wall 30, the teeth frictionally anchor into the rear wall 30 to displace the rear wall 30 into the recessed areas between the teeth.

After engaging the rear wall 30, the stud portion 28b of the clinch stud 28 extends through opening in the rear wall 30 of the beam at a location to engage and extend through the flange 24 of the crush can 14. A nut 34 is then threadably engaged with the stud portion 28b of the clinch stud 28 and threaded toward the head portion 28a until it contacts the rear surface of the flange 24. To further prevent direct contact between the different metals, such as with the use of the steel clinch stud 28 and nut 34, an insulator, such as a polymer or rubber washer, may optionally be disposed between the nut and the rear surface of the flange. Also or alternatively, a coating may be applied to the washer or rear surface of the flange of the crush can. The clinch stud 28 and nut 34 thereby fixedly attach the flange 24 of the crush can 14 to the rear wall 30 of the reinforcement beam 12.

To also or alternatively prevent corrosion between the aluminum alloy of the crush cans and the steel material of the reinforcement beam, a coating may be applied to the reinforcement beam and/or of the crush cans at the interfacing area between the reinforcement beam and the crush can, such as at the interfacing surface of the reinforcement beam and/or the interfacing surface of flange of the crush can. As shown for example in FIG. 2, the outer surface of the reinforcement beam 12, including the end portions 16 of the reinforcement beam 12, has a coating 36 that prevents direct contact between the steel material of reinforcement beam 12 and the aluminum alloy of the crush can 14, such that the coating 36 is disposed in direct contact with the crush can 14 to provide a barrier between the steel reinforcement beam 12 and the end plate of the crush can 14. The coating 36 thus deters corrosion or failure between the steel and aluminum materials of the bumper assembly components.

The coating may be a thermoset or a thermoplastic coating and may comprise an epoxy, polyester, polyurethane, or acrylic or combinations thereof. As such, the coating may be applied or otherwise disposed on the outer surface of the reinforcement beam via powder coating or electrophoretic disposition. Optionally, the coating may include two or more layers at the end portions of the reinforcement beam that attaches to the crush can. It is also contemplated that the coating may include a zinc coating at an interfacing area of the reinforcement beam and/or of the crush cans, such as at a rear-facing surface of the reinforcement beam that mates with the flange of the crush can. Thus, the dual material coupling features may also or alternatively include the use of a coating, such as zinc or paint, that prevents direct contact and acts as a barrier between the steel material of the reinforcement beam and the aluminum alloy of the crush can.

In another implementation of a dual-material coupling feature 126 shown in FIG. 4A, a clinch stud 128 has a head portion 128a attached at the crush can 114 in engagement with a rear surface of the flange 124, such as to compress the aluminum alloy of the crush can 114 into the recessed areas on the head portion 128a. Again, the head portion of the clinch stud may include teeth spaced circumferentially around the head portion that protrude axially toward the opposing end of the clinch stud, such that the recessed areas on the head portion 128a are defined between the teeth. Upon pressing the clinch stud 128 against the rear surface of the flange 124, the teeth frictionally anchor into the flange 124 and the adjacent aluminum material is pressed into the recessed areas between the teeth. As shown in FIG. 4A, the stud portion 128b of the clinch stud 128 extends through the flange and the rear wall of the reinforcement beam 112, so as to locate a distal end of the stud portion 128b in the interior volume of the reinforcement beam. The stud portion 128b has threads configured to receive a nut 134. The nut 134 is threadably engaged with the stud portion 128b of the clinch stud 128 and placed into contact with the rear wall 130 of the reinforcement beam to form the connection between the flange 124 of the crush can 114 and the rear wall 130 of the reinforcement beam 112.

As shown in FIG. 4B, another example of a dual-material coupling feature 226 includes a self-piercing and clinching (SPAC) nut 234 that is attached or engaged at a rear surface of the flange 224 of a crush can. Similar to the head portion of a clinch stud, a press may force the SPAC nut 234 against the rear surface of the flange 224 to compress and deform the edge of the opening in the flange 224 into recessed areas on the SPAC nut 234. As shown in FIG. 4B, with the flange 224 of the crush can aligned with the reinforcement beam, a bolt 228 is threadably engaged with the SPAC nut 234, such that a head portion 228a of the bolt 228 contacts the rear wall 230 of the reinforcement beam 212 and a threaded portion 228b extends rearward through the rear wall 230 and the flange 224 of the crush can 214. The bolt 228 may be made of a non-metal material, such as a polymer, and/or the outer surface of the bolt 228 may have a coating to prevent direct contact between the different metals of the bolt, the reinforcement beam, and the crush can. Like the clinch studs shown in FIGS. 3 and 4A, it is contemplated that in other examples that the SPAC nut may be reversed from the example shown in FIG. 4B, so as to attach or engage the SPAC nut at the rear wall of the reinforcement beam.

As shown in FIG. 4C, a further example of a dual-material coupling feature 326 includes a resistance spot rivet (RSR) element 328 that is attached at and extends through a flange 324 of a crush can to engage the steel reinforcement beam. When in the engaged position, the RSR element 328 has a head portion 328a that contacts the rear surface of the crush can flange 324, such as in direct contact or indirect contact where a washer or other barrier is provided between the materials of the RSR element and the crush can. The RSR element 328 has a shank portion 328b that integrally extends from the head portion 328a through the flange 324 and is attached with a resistance spot weld 329 to the rear wall 330 of the reinforcement beam 312. The RSR element 328 may have generally the same or similar type of steel material as the rear wall 330 of the reinforcement beam to provide such a weld. The head portion 328a of the RSR element 328 may have a coating or an insulator that may otherwise be provided to prevent corrosion between the RSR element 328 and the aluminum alloy of the flange 324 of the crush can. It is also contemplated that in other examples that the RSR element may be reversed from the example shown in FIG. 4C, such as to be formed of aluminum so as to be capable of being welded with the flange of the crush can.

Furthermore, as shown in FIG. 4D, another example of a dual-material coupling feature 426 includes an element arc spot weld (EASW) rivet, which like the RSR element is configured to be welded with a bumper assembly component having the same or similar material. The EASW rivet is provided with a ring element 428 that has a protrusion portion engaged within a hole in the flange 424 and ring portion engaged with a perimeter area surrounding a hole in the flange 424 of the crush can, such as by directly or indirectly contacting the rear surface of the flange 424. A puddle weld 429 is disposed in a central opening of the ring element 428 to attach the protrusion portion of the ring element 428 to the rear wall 430 of the reinforcement beam. The ring element 428 of the EASW rivet may have an adhesive, a coating, or an insulator material that prevents corrosion between the EASW rivet and the aluminum alloy of the flange 424 of the crush can. Again, in other implementations the EASW rivet may be reversed from the example shown in FIG. 4D, such as to have the ring element formed with the same or similar aluminum alloy as the flange of the crush can to be welded to the crush can.

Referring again to the bumper assembly 10 shown in FIGS. 2 and 3, the crush cans 14 includes a tubular body or portion 22 and end plates that attach at opposing ends of the tubular portion 22 to engage the reinforcement beam 12 and the frame tips or end portions of the vehicle frame. The tubular portion 22 of the crush can 14 has a generally hollow rectangular cross-sectional shape when taken transverse to the length of the tubular body 22. Crush initiators, provide as cut holes, are arranged at the corners of the crush can near the front flange 24. The cross-sectional shape is generally uniform along the length of the tubular body 22, as a result of the tubular body 22 being extruded from an aluminum alloy and cut to the approximate length of the crush can 14. The aluminum alloy of the crush cans 14 may comprise a 6000 series, 7000 series, 8000 series, or other alloy with a preferred impact strength, weight, and cost for the bumper assembly 10 disclosed herein. In additional implementations of the crush can, the tubular body may be roll formed or stamped from a metal sheet material and/or may have a cross-sectional shape that is altered or tapers along the length.

The end plates of the crush can 14 shown in FIGS. 2 and 3 are made of an aluminum alloy and are welded to the ends of the tubular body 22. At the ends of the tubular body 22, the end plates extend laterally outside the peripheral edge of the tubular body 22 to form the front, beam-side flange 24 and the rear, frame-side flange 25 at the respective front and rear ends of the crush can 14. As shown in FIG. 2, the front flange 24 extends around the peripheral edge of the tubular body 22 and protrudes laterally a greater extent from the sides of the tubular body 22 of the crush can 14 than the upper and lower edges. The lateral portions of the front flange 24 has holes for the dual-material coupling feature 26 to extend through for attaching the reinforcement beam 12 to the crush can 14. As also shown in FIG. 2, the frame-side flange 25 can be a fastened through the hole or opening to a portion of the vehicle frame. A planar extent of the front flange 24 is disposed to correspond with the mating surface of the reinforcement beam 12. Depending on the curvature of the reinforcement beam and the mounting location of the crush can, the angle of the planar extent of the front flange can be between 70 and 110 degrees relative to a longitudinal axis the tubular body of the crush can.

The reinforcement beam 12, such as shown in FIG. 2, may be longitudinally curved in order to correspond with a bumper design of a particular vehicle so as to span across the width of the vehicle frame. The reinforcement beam 12 may be manufactured by roll forming a high-strength steel sheet, such as by uncoiling the sheet from a roll of sheet stock and roll forming the sheet to have a desired cross-sectional shape for efficiently absorbing impact energy, while minimizing the weight of the beam. The sheet may be continuously welded in the roll forming operation, such as via laser welding, to fix the formed sheet in the formed cross-sectional shape, such as with the closed tubular portions 18, 20. The beam 12 may be made from a sheet of steel material having a thickness of 0.8 mm to 1.4 mm or approximately between 1 mm and 1.5 mm. Also, the sheet may have a tensile strength of about 800 to 2000 MPa (i.e. about 120 to 290 ksi). In additional implementations the reinforcement beam can be made of different materials, including AHSS (Advanced High Strength Steels) and it can be made from a sheet having a thickness of about 0.8 mm to 3.0 mm thick.

As shown in FIG. 3, the reinforcement beam 12 is formed to have two adjacent tubular portions 18, 20 that share a common center wall 38 of the beam 12. The outer sections of the metal sheet that form the two adjacent tubular portions 18, 20 extend from opposing sides of a center section of the metal sheet that forms the common center wall 38 of the beam. Once the beam 12 is formed, the two adjacent tubular portions 18, 20 of the beam 12 are defined by front walls 40, 42, rear walls 44, 46, an upper wall 48, and a lower wall 50.

The front walls 40, 42 of the adjacent tubular portions 18, 20 are substantially aligned with each other so as to form an outward facing or impact surface of the beam and corresponding bumper assembly 10. The front walls 40, 42 each include a stiffening rib 52 that is about 8 mm to 10 mm deep and 8 mm to 10 mm wide, where the beam 12 is about 80 mm high and 40 mm deep. The rear walls 44, 46 are also in alignment with each other and are substantially parallel with the front walls 40, 42. Further, the upper and lower walls 48, 50 are substantially parallel with each other and the center wall 38 and generally perpendicular with the front and rear walls 40, 42, 44, 46. The radius of curvature at the corners between the walls of the beam 12 is between 3-4 mm, but may be greater in additional implementations, such as for sheet stock with a greater thickness. It is understood that additional examples of the beam may assume various shapes and orientations from that shown in FIG. 3 and may include alternatively dimensioned proportions, such as for different applications of the beam.

Figure 5:
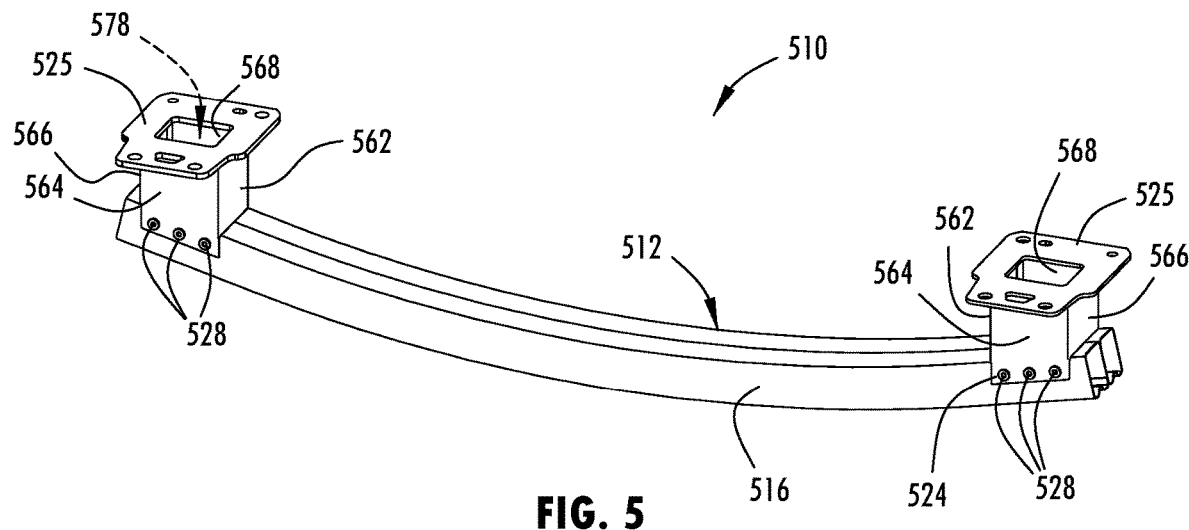
FIG. 5 is a perspective view of another bumper assembly.
Figure 6:
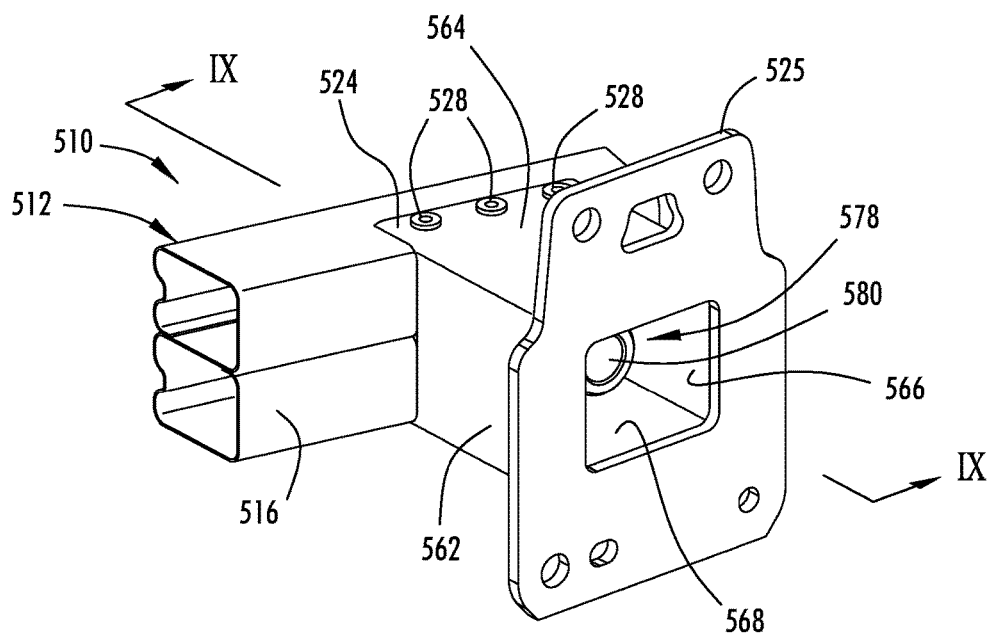
FIG. 6 is a perspective view of an end portion of the bumper assembly of FIG. 5, showing the crush can attached to the reinforcement beam.
Figure 7:
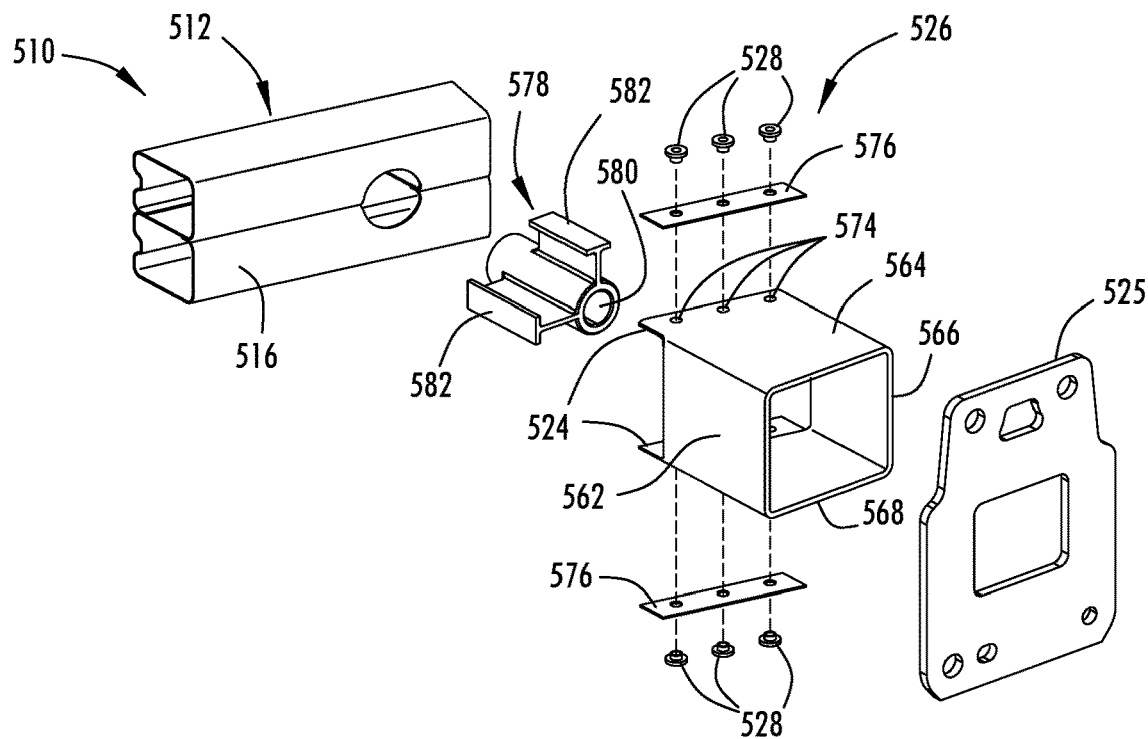
FIG. 7 is a rear exploded perspective view of the end portion shown in FIG. 6.
Figure 8:
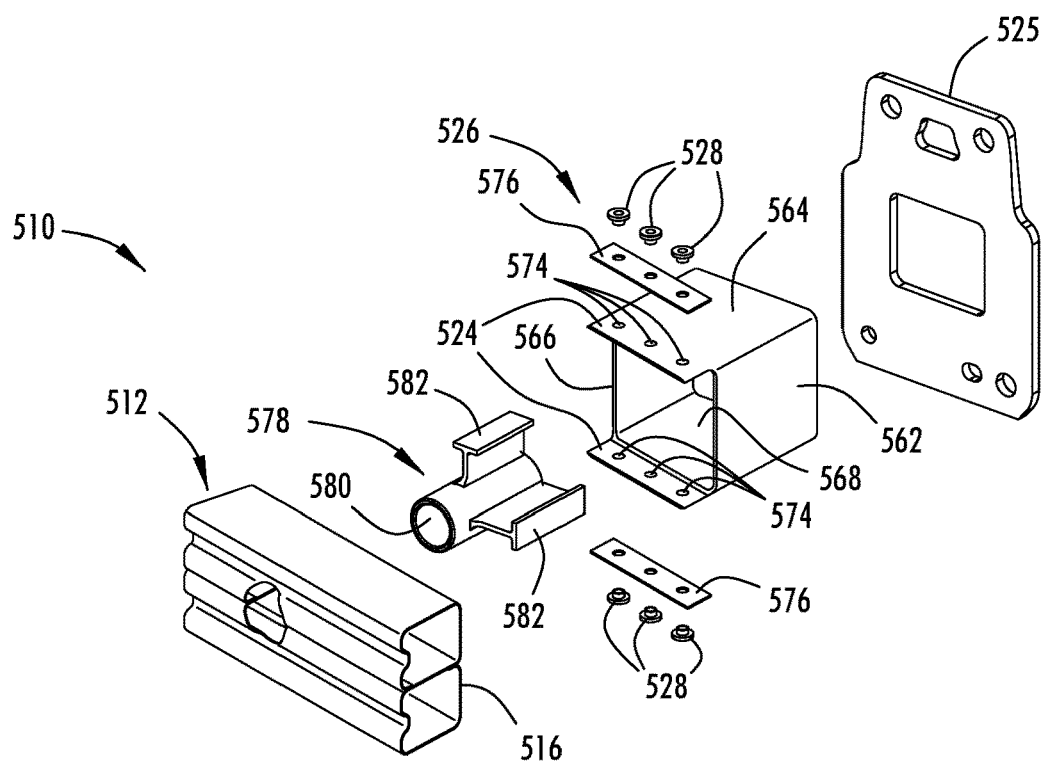
FIG. 8 is a front exploded perspective view of the end portion shown in FIG. 6.

Referring now to FIGS. 5-10, a hybrid bumper assembly 510 includes a reinforcement beam 512 and crush cans 514 that are attached to end portions 516 of the reinforcement beam 512. The reinforcement beam 512 is substantially similar to the reinforcement beam 12 shown in FIG. 2 and described above, but with a greater depth to height ratio. As shown in FIGS. 6-8, the crush cans 514 each have a tubular body 522 formed by walls 562, 564, 566, 568 that are generally perpendicularly arranged relative to each other and an end plate 525 that is attached via welding at the rear end of the tubular body 522 to engage the frame tips or end portions of the vehicle frame. The front sections of the crush cans 514 are machined to remove a portion of the side walls 562, 566 from the tubular body 522 to form a channel between the upper and lower walls 564, 568 for receiving the reinforcement beam 512. The upper and lower walls 564, 568 effectively provide front flanges 524 that integrally protrude longitudinally in alignment with the longitudinal extent of the upper and lower walls 564, 568 of the tubular body 522. The front flanges 524 overlay the respective upper and lower walls of the reinforcement beam 512 and use a dual-material coupling feature 526 to form a secure connection between the crush cans 514 and the reinforcement beam 512.

As shown in FIGS. 7 and 8, the tubular body 522 of the crush can 514 has rounded corners between the integrally connected walls 562, 564, 566, 568 to provide a generally hollow rectangular cross-sectional shape when taken transverse to the length of the tubular body 522. Similar to the crush can 14, the cross-sectional shape of the tubular body 522 is generally uniform along the length of the tubular body 522, as a result of being extruded from an aluminum alloy and cut to the approximate length of the crush can 514. The aluminum alloy of the crush cans 514 may comprise a 6000 series, 7000 series, 8000 series, or other alloy with a preferred impact strength, weight, and cost for the bumper assembly 510. Again, additional implementations of the tubular body may be roll formed or stamped from a metal sheet material and/or may have a cross-sectional shape that is altered or tapers along the length.

Figure 9:
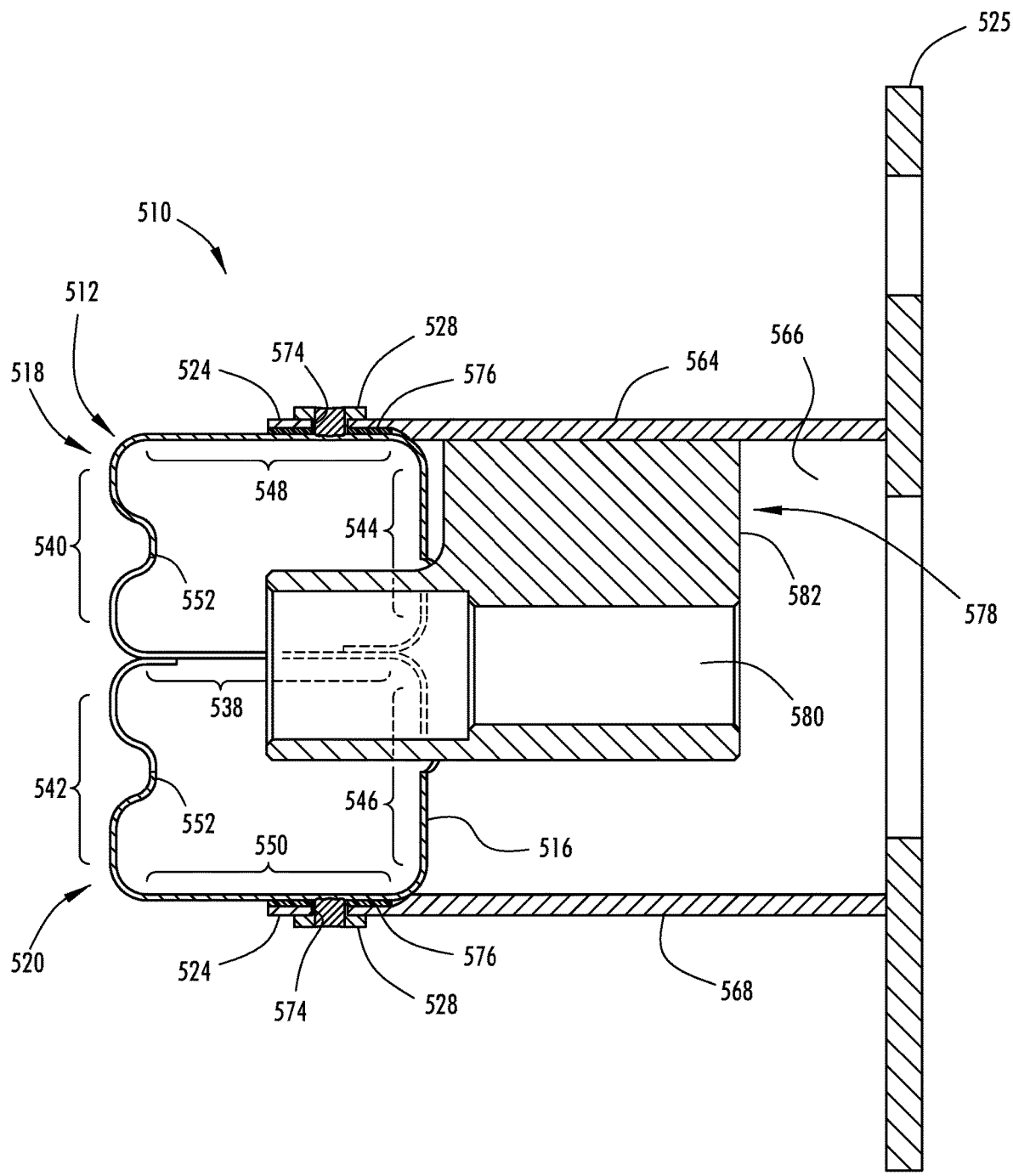
FIG. 9 is a cross-sectional view of the end portion taken at line IX-IX in FIG. 6.

As further shown in FIGS. 7-9, the outside profile of the reinforcement beam 512 is cut from the front section of the tubular body 522 to mate the reinforcement beam 512 between the flanges 524 in a conforming manner. As a result, the upper and lower walls 564, 568 of the tubular body 522 that form the flanges 524 have a reduced thickness at the front section that terminates in a rounded shape that corresponds to the rounded upper and lower corners of the reinforcement beam 512, such as shown in FIG. 9. At the point that the reduced thickness of the upper and lower walls 564, 568 terminates, the side walls 562, 566 of the tubular body 522 are cut to have a straight edge that contacts along the rear wall of the reinforcement beam 512.

The dual-material coupling feature 526 shown in FIGS. 5-9 provides an EASW rivet with a ring element 528 that is disposed in holes 574 extending through the flanges 524. The ring element 528 is made of a steel material that generally corresponds with the steel material of the reinforcement beam 512 so as to allow the ring element 528 to be welded to the beam 512, as shown in FIG. 9. The ring element 528 that has a protrusion portion engaged within the hole 574 in the flange 524 and ring portion engaged with a perimeter area surrounding the hole 574 in the flange 524 of the crush can, such as by directly or indirectly contacting the outer surface of the flange 524. A puddle weld 529 is disposed in a central opening of the ring element 528 to attach the ring element 528 to the respective upper or lower wall of the reinforcement beam 512. The ring element 528 may have an adhesive, a coating, or an insulator that prevents corrosion between the ring element 528 and the aluminum alloy of the flange 524 of the crush can 514.

As further shown in FIGS. 7 and 8, isolator pads 576 are adhered to the inside surfaces of the front flanges 524 to contact the top and bottom surfaces of the reinforcement beam 512. The isolator pads 576 are adhered with an adhesive backing at the inside surfaces of the flanges 524 so as to be disposed between and physically separate the flanges 524 from the reinforcement beam 512. The isolator pads 576 have clearance holes to allow the fasteners, shown as ring elements 528, to pass through and made contact with the reinforcement beam 512. The isolator pads 576 are strips of a polymer material, such as a nylon; although it is contemplated that alternative implementations may utilize different strip configurations or materials, such as polyethylene, polypropylene, polyvinyl chloride, or other thermoplastic or thermosetting polymers.

In one of the crush cans 514 shown in FIG. 5, a tow hook bushing 578 is disposed within the hollow interior volume of the crush can 514. The tow hook bushing 578 includes a threaded receiver portion 580 and arm portions 582 that extend from the threaded receiver portion 580 to attach at the interior surfaces of the tubular body 522, shown attaching at the side wall 562 and the upper wall 564. The arm portions 582 have T-shaped ends to provide an enlarged contact surface between the arm portions 582 and the interior surfaces of the tubular body 522. The tow hook bushings 578 are formed from aluminum so that they can be welded to the tubular body 522. In alternative implementation's, the tow hook bushing may alternatively be formed with a steel material that is welded to the reinforcement beam.

Figure 10:
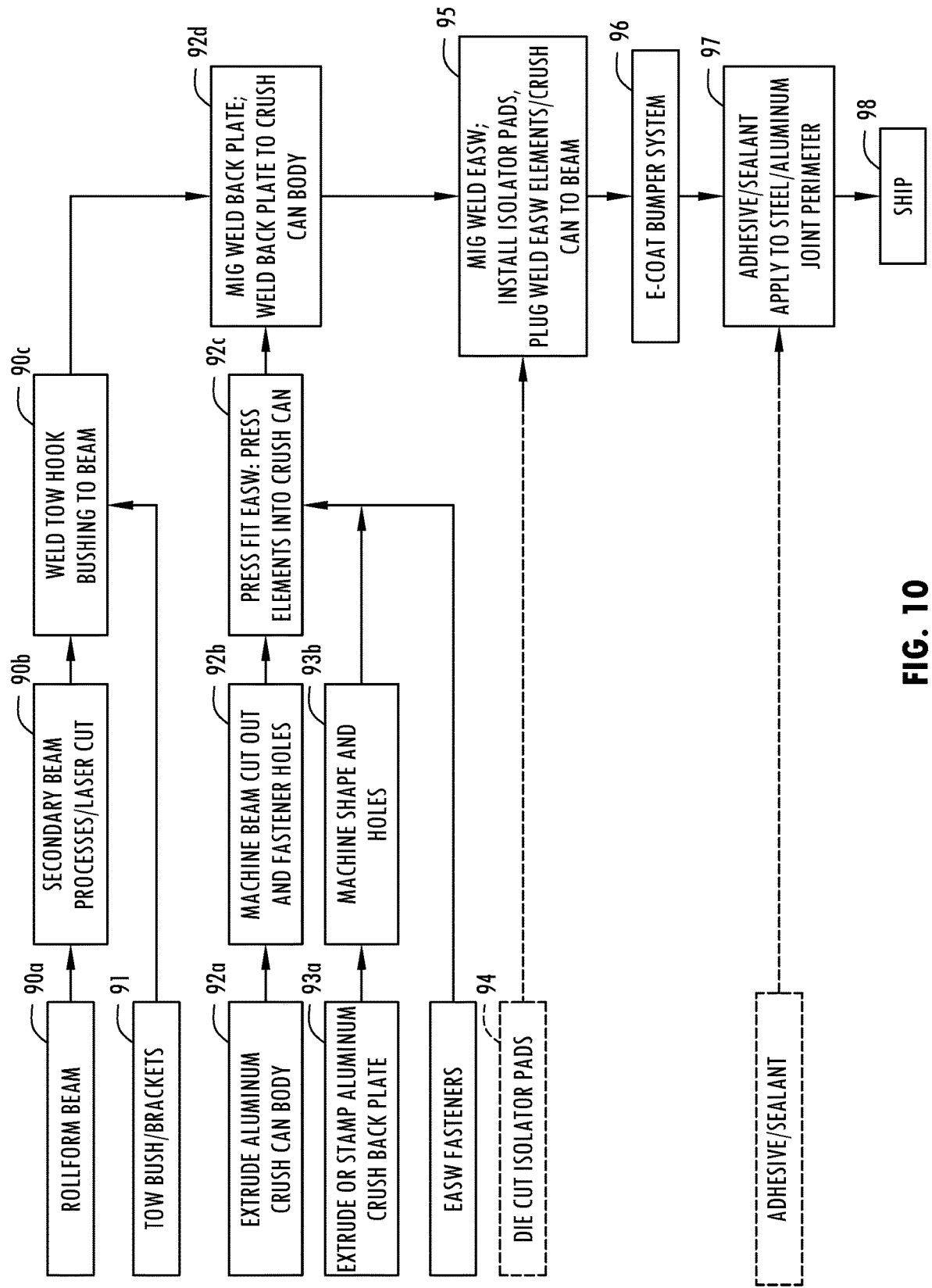
FIG. 10 is a flow chart of a forming method of a bumper assembly.

With reference to FIG. 10, one example of a forming method of a hybrid bumper assembly is shown that describes separate processes leading to the assembling and shipping of the hybrid bumper assembly. For the reinforcement beam, the method describes at step 90a forming the steel reinforcement beam with a roll forming process. Once the beam is formed, a secondary process 90b is done to laser cut the openings in the beam, such as the opening at the front face for the tow hook bushing. In this example, the tow hook bushing and brackets are formed from steel at step 91 and then welded at step 90c to the reinforcement beam.

With respect to the crush can processing shown in FIG. 10, the tubular body is extruded from aluminum at step 92a and then machined at step 92b to cut out a channel at the front section, similar to that shown in FIG. 5. The machining also involves forming fastener holes through the front flange, such as by drilling out the holes. The holes in the flange are then press fit with an EASW element at step 92*c*. Separate from the tubular body processing, the back plate of the crush can may be extruded or stamped at step 93*a*, which is then machined to have a final shape and holes at step 93*b*. The back plate of the crush can is then welded to the rear section of the tubular body at step 92*d*.

Still referring to the process shown in FIG. 10, prior to assembling the crush can and reinforcement beam, isolator pads may be die cut at step 94, such being die cut from a nylon sheet material to include both the perimeter shape of the pad as well as the clearance holes for the EASW elements. The isolator pads are then installed between the interfacing surfaces of the reinforcement beam and the front flanges of the crush can at step 95 prior to welding the EASW elements to the reinforcement beam to thus attach the crush can to the reinforcement beam. The assembled reinforcement beam and crush can may then be painted with an electrostatic coating (e-coating) processing 96. To further insulate the joint between the reinforcement beam and the crush can, at step 97 an adhesive or sealant is applied to the perimeter of the interfacing surfaces of the reinforcement beam and the crush can. When the adhesive or sealant has cured, the bumper assembly may then be shipped or otherwise further assembled to a vehicle at step 98.

Figure 11:
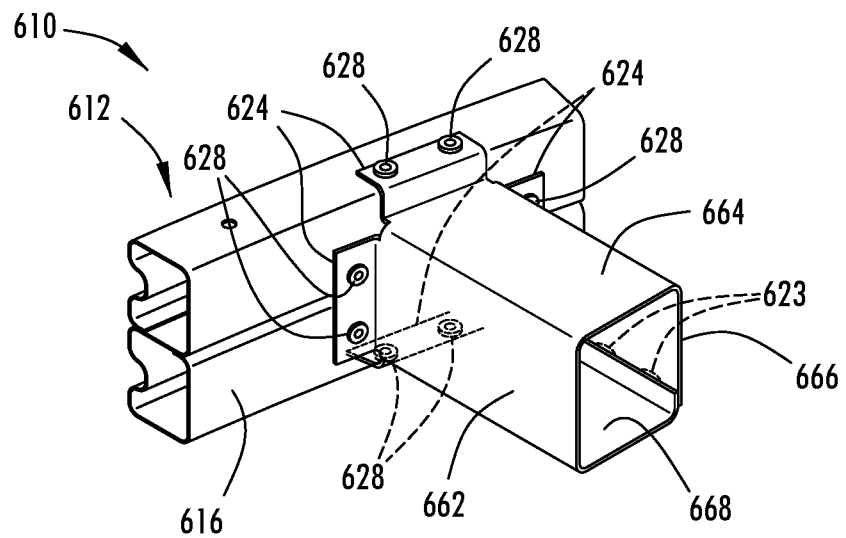
FIG. 11 is a perspective view of an end portion of a bumper assembly with a crush can having flanges attached to a reinforcement beam.

In other examples, such as shown in FIG. 11-15, the crush can may be formed with at least one stamping that is formed by stamping a metal sheet material. As shown in FIG. 11, an aluminum sheet is stamped to form a stamped crush can 614. The stampings is attached together with a weld 623 that is formed at a seam between the stamps, such as shown in FIG. 11 extending longitudinally along the tubular body 622 of the crush can 614. The stampings also provide the crush can 614 with a front flange 624 at a front end of the tubular body 622 to create an interface point where a dual-material coupling feature 626 may be applied, such as a resistance spot rivet (RSR), an element arc spot weld (EASW) rivet, a self-piercing and clinch (SPAC) nut with a coated bolt, a clinch stud, or a self-piercing rivet (SPR), among others coupling features. Again, the dual-material coupling feature may, in addition to a mechanical coupling feature, also include an isolator pad and/or an adhesive to assist with forming the connection and providing a barrier between the dissimilar materials.

As shown in FIG. 11, the crush can 614 may be shaped to have the tubular body 622 that includes four walls that together provide a generally rectangular cross-sectional shape. In doing so, the front flange 624 may protrudes laterally outward from a longitudinal extent of the tubular body 622 at a front end of each of the four walls of the tubular body 622, such as to provide four rectangular shaped front flanges. The front flange that extends from the upper wall of the tubular body 622 may be formed to also protrude forward to overlay and attach at an upper wall of the reinforcement beam 612.

Figure 12:
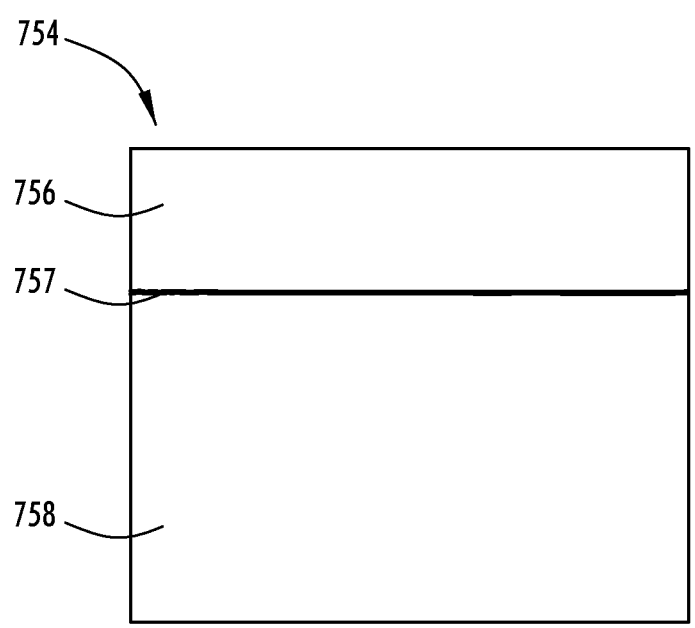
FIG. 12 is a plan view of a tailor welded blank.
Figure 13:
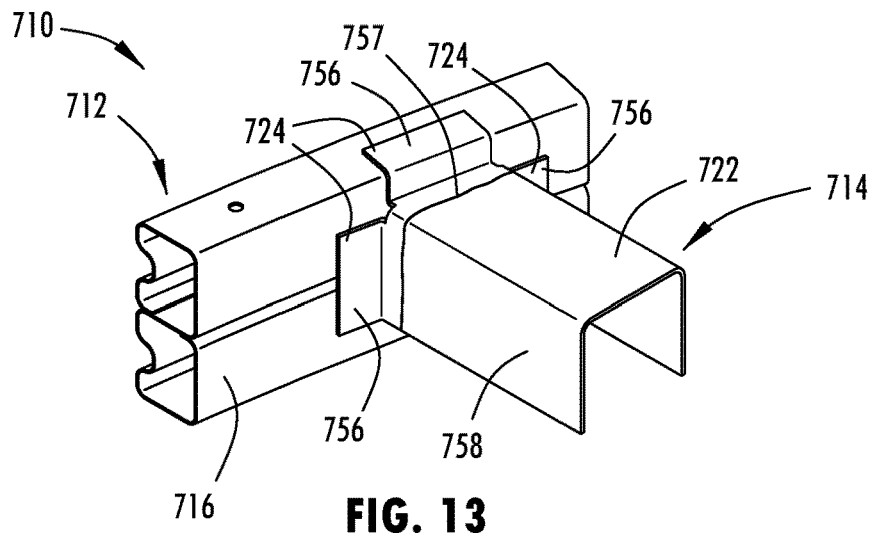
FIG. 13 is a perspective view of an end portion of a bumper assembly with a crush can formed from a tailor welded blank.
Figure 14:
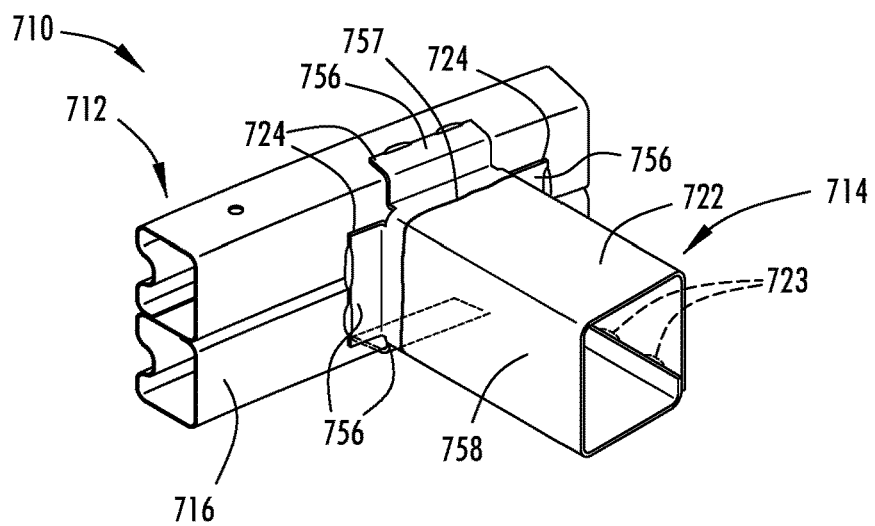
FIG. 14 is perspective view of another crush can formed from a tailor welded blank.
Figure 15:
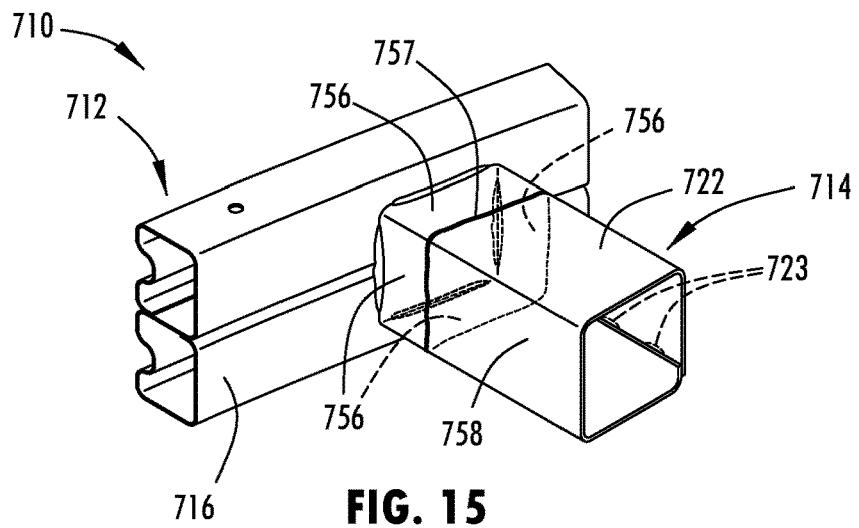
FIG. 15 is perspective view of another crush can formed from a tailor welded blank.

In other examples, such as shown in FIGS. 12-15, the joining technology involves forming the crush can 714 with a tailor welded blank 754 (FIG. 12) that includes a steel sheet portion 756 that is braze welded 757 at a butt joint to an aluminum sheet portion 758. As shown in FIG. 12, the tailor welded blank 754 integrates steel and aluminum into the same sheet so as to be capable of providing a steel-to-steel interface at the joint between the crush can and the reinforcement beam, which may be joined with traditional welding and attachment techniques. The tailor welded blank 754 may be stamped to form the steel sheet portion 756 as at least part of a flange 724 of the crush can 714, such that a fusion weld may connect the steel sheet portion 756 of the crush can 714 with the steel material of the reinforcement beam 712. As shown in FIGS. 13 and 15, the crush can 714 may be shaped to have the tubular body 722 includes four walls that together provide a generally rectangular cross-sectional shape. In FIG. 13, the front flange 724 protrudes laterally outward from a longitudinal extent of the tubular body 722 at a front end of each of the four walls of the tubular body 722. The front flange that protrudes from the upper wall of the tubular body 722 may protrude forward to overlay and attach at an upper wall of the reinforcement beam 712. In an additional implementation shown in FIG. 14, the tailor welded blank 754 is stamped or otherwise formed to have an open cross-sectional shape without a lower wall, but otherwise attaches to the reinforcement beam in a similar manner that shown in FIG. 13.

In another example, as shown in FIG. 15, the tailor welded blank that includes a steel sheet portion 856 that is braze welded to an aluminum sheet portion 858 is formed as a crush can 814 that generally lacks a front flange, such that the front end of the tubular body 822 is attached at a T-joint with the reinforcement beam 812. The tailor welded blank may be stamped to form the steel sheet portion 856 at the front end of the tubular body 822, such that a weld 859 may connect the steel sheet portion 856 of the crush can 814 with the steel material of the reinforcement beam 812.

Figure 16:
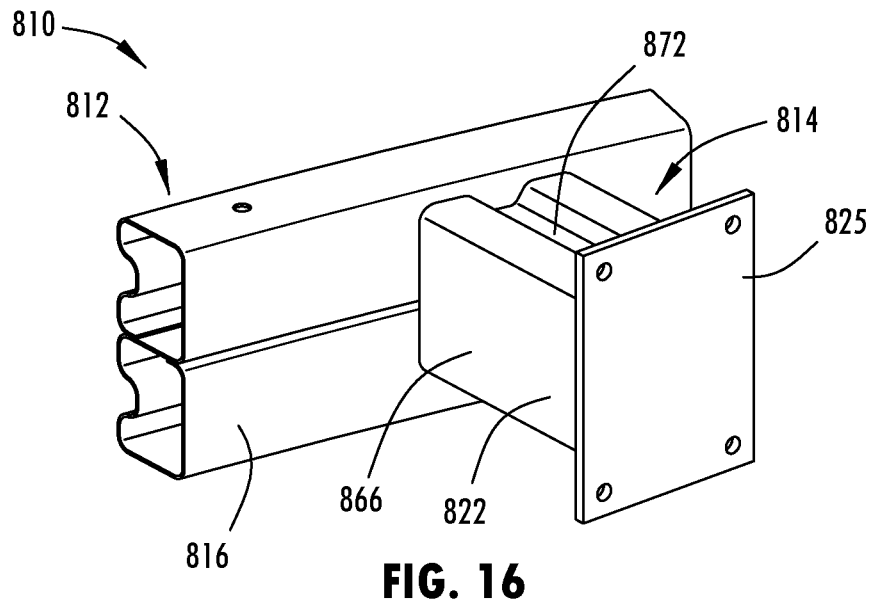
FIG. 16 is a perspective view of an end portion of a bumper assembly with a crush can attached to a reinforcement beam.
Figure 17:
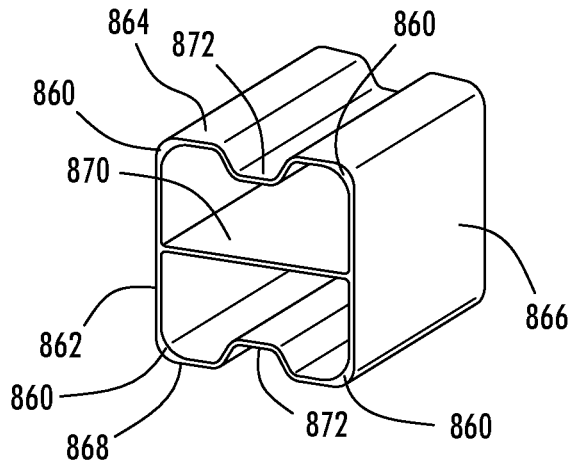
FIG. 17 is a perspective view of the crush can shown in FIG. 16.
Figure 18:
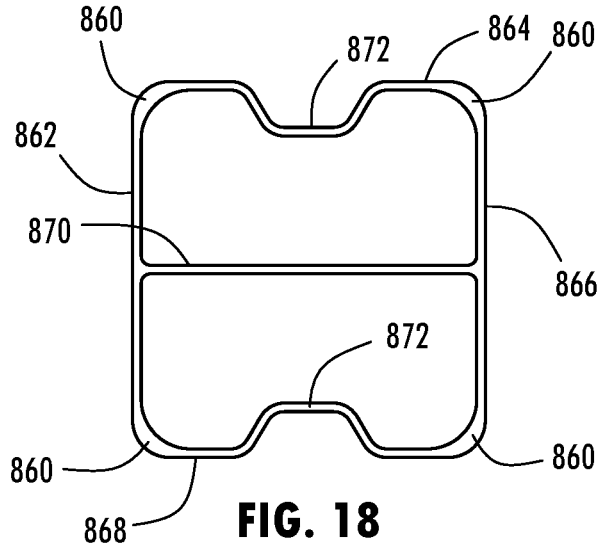
FIG. 18 is a cross-sectional view of the crush can shown in FIG. 16.

As shown in FIGS. 16-18, another implementation of the crush can 914 may have a tubular body 922 that is extruded in a cross-sectional shape that has increased mass or thickness at the corner portions 960. The tubular body 922 of the crush can 914 may have a constant cross-sectional shape along a longitudinal extent of the tubular body 922, where the shape may provide at least one enclosed tubular shape. The crush can 914 shown in FIGS. 16-18 has four exterior side walls 962, 964, 966, 968 and an interior wall 970 that extends between opposing exterior side walls 962, 966 to provide two separate interior chambers, which may also be considered two tubular shapes that share a common center wall. Such a two chamber design may be preferable to cover a wide load range, such as between 60 kN and 180 kN, which may cover many design cases. The center wall 970 may also assist to control and stabilize folding of the crush can 914 under impact loads, which are typically directed longitudinally along the length of the crush can 914. The exterior side walls 962, 964, 966, 968 are generally perpendicularly arranged relative to each other to provide a substantially rectangular cross-sectional shape. It is also understood that other examples of the crush can may have various alternative cross-sectional shapes.

Figure 19:
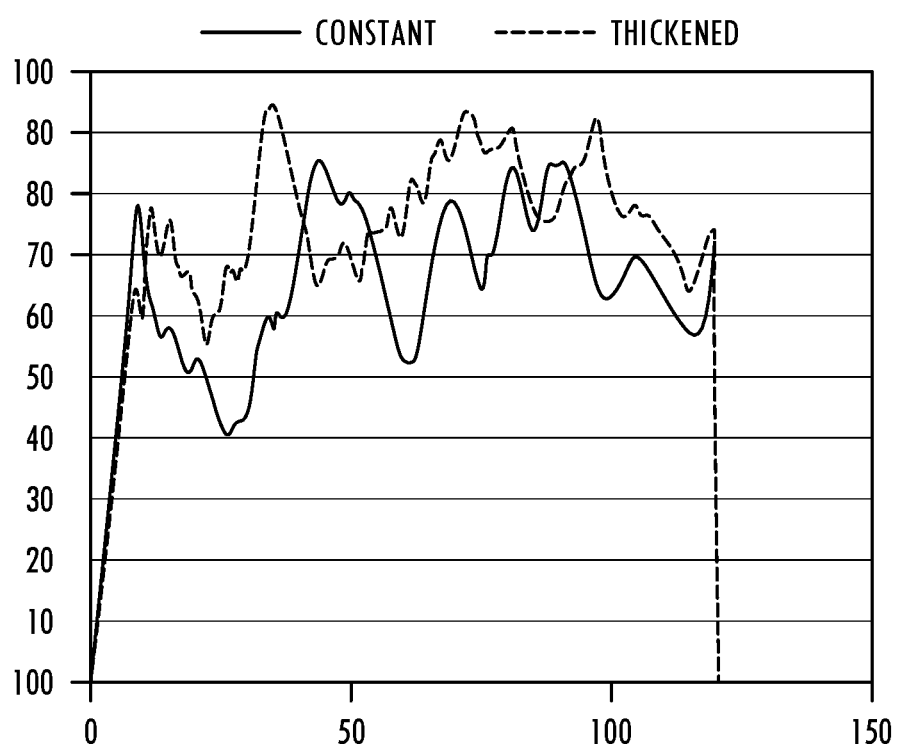
FIG. 19 is a force-deflection chart showing test results of longitudinal compression testing of the crush can shown in FIG. 16.

To improve impact energy absorption performance, a thickness at the outer corner portions 960 that are disposed between adjacent exterior side walls 962, 964, 966, 968 of the crush can 914 may be increased relative to the thickness of the exterior side wall, such as shown in FIG. 18. For example, an increase in thickness of the corner portions 960 from 2 mm to 3 mm may result in approximately 6.5% increase in specific energy absorption (SEA) values and approximately 5% increase in crush force efficiency (CFE). This increase in performance between a corner with constant thickness and an increase in thickness is shown in an exemplary chart in FIG. 19.

To also increase performance of the crush can, the exterior walls may include a stiffening rib 972, such as shown as the indented channel formed at the upper and lower exterior walls 964, 968 in FIGS. 17 and 18. Although the crush can 914 shown in FIGS. 16-18 does not have a front flange, other examples of crush cans may include thickened corners similar the crush can shown in FIGS. 16-18 and have a front flange similar to the crush cans shown in FIGS. 2, 3, and 5-9 to provide a larger interfacing area with the reinforcement beam, such as for the use of dual-material coupling features. For example, to attach the aluminum crush can 914 to the steel reinforcement beam, electromagnetic pulse welding may be used. This type of welding, unlike traditional welding techniques, may be used as it removes oxides at the weld seam and creates a bond that is less susceptible to bimetallic or galvanic corrosion.

Further, another joining technology that may be implemented to attach an aluminum crush can, such as the crush can 914, to a steel reinforcement beam is a rubber bulge joining process. To use such a process the crush can is provided as a hollow tubular body, generally without a front flange, such as a tubular body that is extruded with a consistent cross-sectional shape, as described above and shown for example in FIGS. 16-18. The front portion of the tubular member is inserted in an opening formed in the rear wall of the reinforcement beam so that a front section of the crush can intersects the rear wall. A piece of rubber is inserted into the hollow interior of the crush can and arranged at the front section that intersects with the rear wall, such that the rubber piece is generally evenly divided by a planar extent of the rear wall. When the crush can and rubber piece are so positioned at the reinforcement beam, the rubber piece is compressed longitudinally along the length of the crush can, such that it is forced to expand laterally outward and deform the exterior walls of the crush can outward at both sides of the rear wall. The deformed front section of the crush can fixes the crush can to the reinforcement beam. This rubber bulge joining process may be performed at multiple locations along a single crush can, such as at a front or intermediate wall of the reinforcement beam that is generally parallel with the rear wall. Further, the rubber bulge joining process may also be used with a reinforcement beam that is formed with multiple sheets of metal that are welded together in perpendicular arrangement relative to each other.

For purposes of this disclosure, the term "coupled" (in all of its forms, couple, coupling, coupled, etc.) generally means the joining of two components directly or indirectly to one another. Such joining may be stationary in nature or movable in nature; may be achieved with the two components and any additional intermediate members being integrally formed as a single unitary body with one another or with the two components; and may be permanent in nature or may be removable or releasable in nature, unless otherwise stated.

Also for purposes of this disclosure, the terms "upper," "lower," "right," "left," "rear," "front," "vertical," "horizontal," and derivatives thereof shall relate to the orientation shown in FIG. 1. However, it is to be understood that various alternative orientations may be provided, except where expressly specified to the contrary. It is also to be understood that the specific devices and processes illustrated in the attached drawings, and described in this specification are simply exemplary of the inventive concepts defined in the appended claims. Hence, specific dimensions and other physical characteristics relating to the examples disclosed herein are not to be considered as limiting, unless the claims expressly state otherwise.

Changes and modifications in the specifically described examples may be carried out without departing from the principles of the present invention, which is intended to be limited only by the scope of the appended claims as interpreted according to the principles of patent law. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A hybrid bumper assembly for a vehicle, the hybrid bumper assembly comprising:
    a multi-tubular reinforcement beam comprising a high-strength steel sheet material;
    a crush can comprising an aluminum alloy and having a tubular body and a flange protruding at a front end of the tubular body; and
    a dual-material coupling feature fixedly attaching the flange of the crush can with a wall of the multi-tubular reinforcement beam.

2. The hybrid bumper assembly of claim 1, wherein the dual-material coupling feature comprises an element arc spot weld rivet.

3. The hybrid bumper assembly of claim 2, wherein the element arc spot weld rivet comprise (i) a ring element engaged with the flange of the crush can and (ii) a puddle weld disposed in a central opening of the ring element attaching the ring element to the wall of the multi-tubular reinforcement beam.

4. The hybrid bumper assembly of claim 1, wherein the dual-material coupling feature comprises a fastening element having (i) a head portion engaging the flange of the crush can and (ii) a shank portion extending from the head portion and coupling with the wall of the multi-tubular reinforcement beam.

5. The hybrid bumper assembly of claim 1, wherein the tubular body of the crush can comprises a first wall, a second wall, a third wall, and a fourth wall that successively interconnect to form a rectangular cross-sectional shape, and wherein a planar extent of the flange extends in longitudinal alignment with the first wall.

6. The hybrid bumper assembly of claim 5, wherein the multi-tubular reinforcement beam comprises an upper wall, a lower wall, a rear wall, and a front wall that together surround the multi-tubular reinforcement beam, and wherein the flange of the crush can is disposed over the upper wall of the multi-tubular reinforcement beam.

7. The hybrid bumper assembly of claim 6, wherein an isolator pad is disposed between the flange and the upper wall of the multi-tubular reinforcement beam.

8. The hybrid bumper assembly of claim 1, further comprising a coating disposed on at least one of the dual-material coupling feature, the reinforcement beam, or the crush can, the coating configured to prevents galvanic corrosion between the aluminum alloy of the crush can and the multi-tubular reinforcement beam.

9. The hybrid bumper assembly of claim 8, wherein the coating comprises a paint that is disposed via powder coating or electrophoretic disposition, and wherein the coating prevents direct contact between the high-strength steel sheet material of the reinforcement beam and the aluminum alloy of the crush can.

10. The hybrid bumper assembly of claim 1, wherein the high-strength steel sheet material of the multi-tubular reinforcement beam is roll formed to provide two tubular portions that extend along a length of the multi-tubular reinforcement beam.

11. The hybrid bumper assembly of claim 1, wherein the flange protrudes laterally outward from a longitudinal extent of the tubular body and is disposed in planar alignment with a rear wall of the multi-tubular reinforcement beam.

12. A hybrid bumper assembly for a vehicle, the hybrid bumper assembly comprising:
- a reinforcement beam having at least one tubular shape that comprises a high-strength steel sheet and that extends along a length of the reinforcement beam;
- a crush can having a tubular body that comprises an aluminum alloy, the crush can further comprising a pair of flanges extending from a front section the tubular body of the crush can; and
- a dual-material coupling feature disposed at each of the pair of flanges and extending between the crush can and the reinforcement beam to form a fixed connection, the dual-material coupling feature configured to prevent galvanic corrosion between the aluminum alloy of the crush can and the high-strength steel sheet of the reinforcement beam.

13. The hybrid bumper assembly of claim 12, wherein the front section of the crush can has a channel disposed between upper and lower walls of the crush can, the reinforcement beam engaged within the channel.

14. The hybrid bumper assembly of claim 13, wherein the pair of flanges that integrally protrude longitudinally in alignment with the longitudinal extent of the upper and lower walls of the tubular body.

15. The hybrid bumper assembly of claim 14, wherein the pair of flanges overlay respective upper and lower walls of the reinforcement beam.

16. The hybrid bumper assembly of claim 12, wherein the tubular body of the crush can comprises four integrally connected walls to provide a generally hollow rectangular cross-sectional shape that is uniform along a length of the tubular body.

17. The hybrid bumper assembly of claim 12, wherein the aluminum alloy of the crush can comprises a 6000 series, 7000 series, or 8000 series alloy.

18. A hybrid bumper assembly for a vehicle, the hybrid bumper assembly comprising:
- a bumper reinforcement beam having a top wall and a bottom wall extending along the length of the beam, the top and bottom walls comprising a high-strength steel sheet;
- a crush can having a tubular portion with four integrally connected walls to provide a generally hollow rectangular cross-sectional shape, the crush can comprising an aluminum alloy;
- wherein the crush can further comprises a pair of front flanges that integrally extend from an upper wall and a lower wall of the tubular portion to define a channel between the pair of front flanges, the bumper reinforcement beam disposed in the channel; and
- a dual-material coupling feature extending between at each of the pair of front flanges and the respective top wall and bottom wall of the reinforcement beam to form a fixed connection, the dual-material coupling feature configured to prevent galvanic corrosion between the aluminum alloy of the crush can and the high-strength steel sheet of the reinforcement beam.

19. The hybrid bumper assembly of claim 18, wherein the dual-material coupling feature comprises an element arc spot weld rivet.

20. The hybrid bumper assembly of claim 18, wherein an isolator pad is disposed between each of the pair of front flanges and the respective top and bottom walls of the reinforcement beam.

* * * * *